(No Model.) 3 Sheets—Sheet 1.
W. CHRISTIE.
BISCUIT MAKING MACHINE.

No. 516,077. Patented Mar. 6, 1894.

Witnesses.
Inventor.
William Christie
by Fetherstonhaugh & Co.
Attys (No Model.) 3 Sheets—Sheet 3.

W. CHRISTIE.
BISCUIT MAKING MACHINE.

No. 516,077. Patented Mar. 6, 1894.

Witnesses. Inventor.
W. J. Withrow. William Christie
H. H. Young by Fetherstonhaugh & Co.
attys.

UNITED STATES PATENT OFFICE.

WILLIAM CHRISTIE, OF TORONTO, CANADA.

BISCUIT-MAKING MACHINE.

SPECIFICATION forming part of Letters Patent No. 516,077, dated March 6, 1894.

Application filed October 2, 1893. Serial No. 486,966. (No model.)

*To all whom it may concern:*

Be it known that I, WILLIAM CHRISTIE, manufacturer, of the city of Toronto, in the county of York, in the Province of Ontario, Canada, have invented certain new and useful Improvements in Biscuit-Making Machines, of which the following is a specification.

My invention relates to an improved attachment for biscuit making machines for delivering fruit upon a sheet of dough previous to its being covered by the top sheet, to form what is known as sultana, raisin, currant or other dried fruit biscuits, and the object of the invention is—first—to provide means whereby the fruit may be adjusted upon the sheet of dough, so that said fruit will lie perfectly close together without over-lapping and present a flat surface to be covered by the top sheet of dough—secondly—to provide means for moistening the fruit before the top sheet of dough is laid upon it and—thirdly—to provide means whereby the constant supply of fruit may be obtained for delivery upon the sheet of dough and it consists essentially—first—of two shaker-boards having interposed between them flattening rollers through which the fruit passes from the top board to the lower board, which has attached to it a flexible lip which rests upon the sheet of dough, suitable mechanism being provided for giving a vibratory movement to the shaker boards as hereinafter more particularly explained—secondly—of a perforated pipe which extends across the sheet of dough above the fruit and is supported on the end of a steam pipe by which it is supplied with moisture and—thirdly—of a fruit supply box from which the fruit is elevated by buckets on an endless chain to a hopper provided with a spout from which the fruit falls upon the upper end of the top shaker board as hereinafter more particularly explained.

Figure 1:
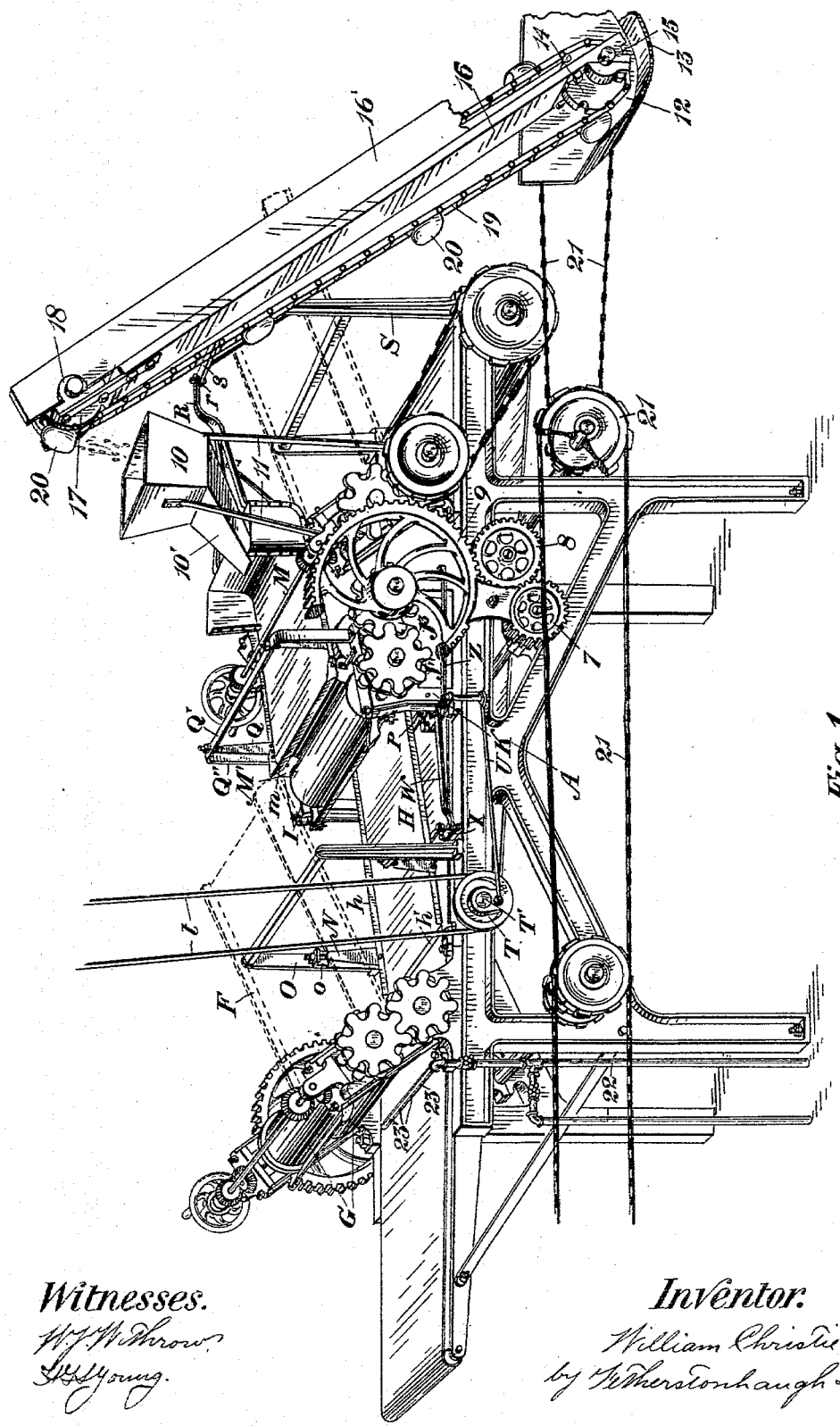
Figure 2:
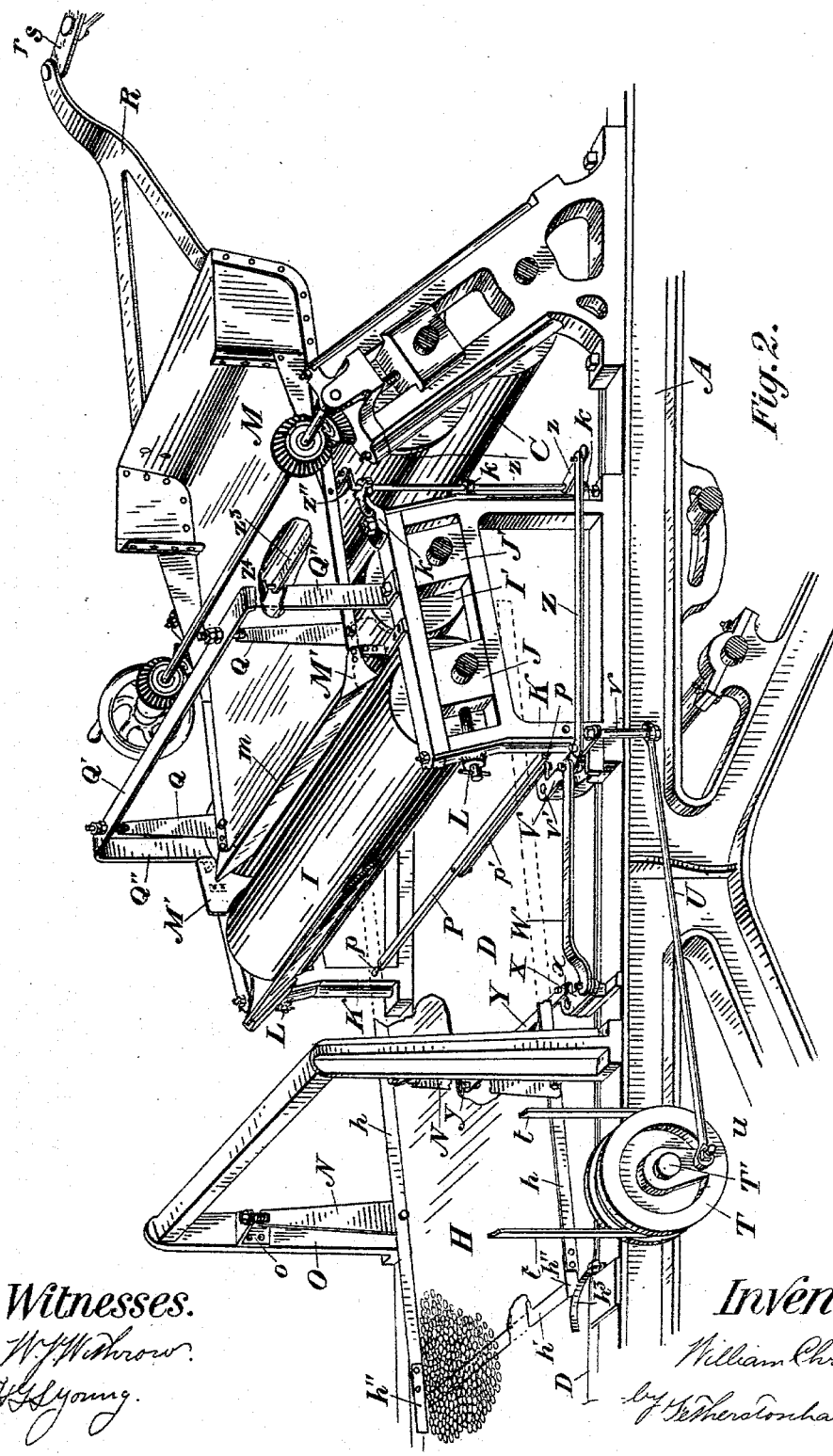
Figure 3:
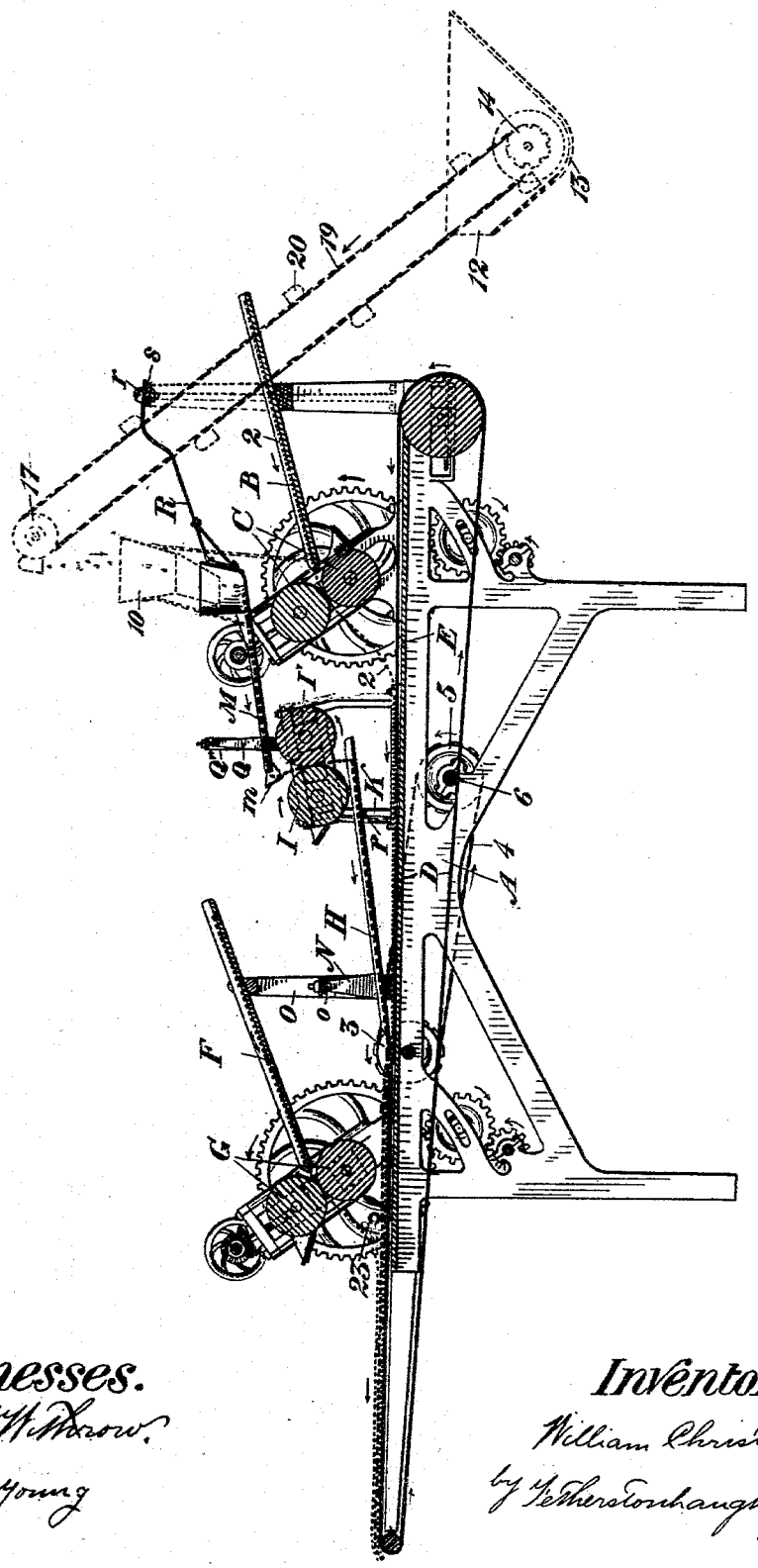

Figure 1, is a perspective view of my improved attachment to an ordinary biscuit machine. Fig. 2, is an enlarged perspective view of the principal parts of my attachment. Fig. 3, is a longitudinal section through the entire attachment.

In the drawings like letters and figures of reference indicate corresponding parts in each figure.

A, is the main frame of the machine, B, the supply board and, C, the feed rollers by which the bottom sheet of dough is fed on to the endless traveling apron, D, which passes over the table, E.

F, is the supply board and, G, the feed rollers by which the upper sheet of dough is laid upon the top of the fruit. The rollers, C, and, G, are driven from suitable gearing and are suitably adjusted apart by suitable means, which it is not necessary to describe as they form no part of my invention.

H, is a slanting lower shaker board, which has turned up sides, *h*.

I, I', are rollers which are journaled at each end in the bearing blocks, J, and, J', supported at each end in the standard, K. The rollers, I, are adjustable by means of the screw spindles, L, extending through the standard into the bearing blocks, J. The rollers, I, are located above the rear end of the slanting shaker board, H.

M, is the upper shaker board which slants from its upper end which is made in the form of a box with open side down to the lower end to which is attached a guiding hopper, *m*. The hopper, *m*, is situated immediately above the middle of the rollers I and I' and is designed to guide the fruit between them.

M', are guiding plates attached to the standard, K, and designed to prevent the fruit from slipping out from between the rollers, I, I'.

The lower shaker board, H, has attached to its forward end a flexible lip, *h'*, made of leather, textile fabric or any other suitable flexible material. The lip, *h'*, rests upon the sheet of dough, 2. The shaker board, H, is supported upon the flexible spring hangers, N, which are connected at the tops to the brackets, *o*, on the standards, O, and at the bottom to the sides, *h*, and upon the laterally adjustable cross bar, P, which is attached to the bottom of the shaker board, H, and is provided with rounded ends, *p*, which extend through holes in the standard, K.

The upper shaker board, M, is supported at its forward end on flexible spring hangers Q attached at their upper end to the cross bar, Q', of the standards, Q", which are situated on the top of the standard, K, and at its rear end upon the reach, R, pivotally attached at, r, to the arm, s, forming part of the standard, S.

The shaker boards, H, and, M, derive their vibratory or shaking movement by the following mechanism.

T, is a crank pulley secured on the shaft, T', deriving motion from the belt, t.

U, is a pitman connected at one end to the crank pin, u, on the crank wheel pulley, T, and at the other end to the pin, v, of the bell crank, V, which is pivoted at, v'. The short end of the bell crank V, is connected by the rod, p', to the cross bar, P, attached to the shaker board, H.

W, is a connecting rod pivotally attached at one end to the long arm of the crank, V, and at the other end to the long arm of the crank, X, which is pivoted at, x, as shown. The short arm of the crank, X, is connected by the rod, Y, to a pin, y, secured at the bottom of the shaker board, H.

Z, is a connecting rod pivotally attached at one end to the long arm of the crank, V, and at the other end to the arm, z, secured at the bottom of the vertical rod, z', which is journaled in bearings, k, attached to or forming part of the standard, K.

z", is a crank attached to or forming part of the vertical rod, z', and connected by the rod z³, to a pin, z⁴, secured at the bottom of the shaker board, M.

The shaker boards, H, and, M, are broken away in Fig. 2 to clearly exhibit the connections above described.

It will now be seen that upon the rotation of the crank wheel, T, the shaker boards, H, and, M, will through the cranks and connecting rods hereinbefore described derive a laterally vibratory or shaking movement, the movement of the upper board however, being more of a laterally swinging movement on account of its being supported at the rear end by the reach, R, pivoted at, r. 3, is a sprocket wheel secured at the opposite end of the shaft T', and connected by the sprocket chain, 4, to the sprocket wheel, 5, on the shaft, 6, (see Fig. 3.) The opposite end of the shaft, 6, has attached to it a gear wheel, 7, (see Fig. 1) which meshes with the gear wheel, 8, which also meshes with the gear wheel, 9, secured on the end of the spindle of the roller, I'.

J", and J³, are gears secured on the spindle of the rollers, I, and, I', and meshing with each other. It will thus be seen that the rollers, I, and, I', derive a rotary movement toward each other through the crank wheel, T, sprocket wheel, 3, connected by a chain, 4, to the sprocket wheel, 5, and chain of gearing, 7, 8, 9, and J", and, J³.

10, is a hopper supported on the legs, 11, which are secured to any suitable portion of the frame of the machine.

10', is a spout leading from the hopper into the box shaped rear portion of the shaker board, M.

12, is a fruit supply bin. The bin, 12, has a concaved bottom, 13.

14, is a sprocket wheel having bearings, 15, on each side of the bin, 12, and, 16, is a board supported on the bearings, 15, and extending obliquely upwardly forwardly therefrom into proximity with the top of the hopper, 10.

16', is a side board attached to the board, 16.

17, is a sprocket wheel having bearings, 18, secured in the upper end of the board, 16.

19, is an endless sprocket chain connecting the sprocket wheels 14, and, 17, and, 20, are a series of buckets secured to the sprocket chain. The sprocket wheel, 14, is driven from a sprocket wheel outside the bin and not shown in Fig. 1, which sprocket wheel is driven through sprocket chain and wheels, 21, deriving motion from any suitable source of power.

22, is a steam pipe leading slightly above the level of the apron and having a branch pipe 23, extending across and above the fruit on the sheet of dough. 23', are perforations made in the branch pipe, 23, which perforations preferably face the forward end of the machine and are designed to throw jets of steam or moisture forwardly upon the fruit before the top layer of dough is placed upon it.

Having now described the principal parts involved in my invention I shall briefly describe the operation and the advantages arising from my attachment.

The fruit in the bin is carried by the buckets, 20, on the end of the sprocket chain, 19, up to the top of the board, 16, from which it is deposited into the hopper, 10, and by the spout, 10', into the shaker board, M, which derives a vibratory or shaking movement as specified. The fruit deposited upon the shaker board, M, is caused by such vibratory movement to spread over the shaker board and the slant of the board causes the fruit to pass down the board to the forward end where the hopper, m, guides the fruit thus spread so that it will pass between the rollers, I, and, I'. By these rollers the fruit is perfectly flattened and drops in such flat state upon the shaker board, H, which also deriving a vibratory lateral movement as specified causes the flat fruit to gather quite perfectly close together and pass down and along such board entirely filling it from side to side. When it reaches the lower end of the board the flexible lip, h', as it rests upon the sheet of dough will allow of the fruit to pass upon the sheet of dough perfectly close together in the same manner as they have gathered upon the shaking board, H. In order to prevent the fruit from being thrown to either the one or the other side of the sheet of dough as it passes off the shaker board I provide at each side of the shaker board butters, h" which are secured to and extend beyond the ends, h. I also provide flat spring fingers, h³, at each side which extend slightly over the sheet of dough and are also designed to guide the fruit as it passes from the shaker board, H. I find in practice that the vibratory movement of the board causes the fruit to gather close together but will not cause portion of such fruit to override or get on top of other portions. The forward end of the board, H, being extremely close to the dough and the flexible lip, h', resting on the dough it will be seen that the separation of the fruit is not at all likely to occur as it is gradually fed upon the dough from the shaker board, H. The manner in which the fruit passes upon the dough will be understood on reference to Fig. 2, in which a portion of the fruit is shown.

It will of course be understood that the speed at which the fruit is fed from the bin into the hopper and from the hopper upon the shaker board, M, will be regulated according to the amount of fruit required to fill the board and pass from such board through the rollers and by the lower shaker board, H, onto the sheet of dough.

It will also be understood that the speed at which the endless apron travels will also be regulated so that the passage of the fruit from off the end of the lip, h', of the board, H, onto the sheet of dough will be at a uniform rate to that at which the sheet of dough passes along beneath the board.

I am aware that heretofore endless aprons have been provided to feed the fruit upon the sheet of dough as it passes such aprons but in such case the drop from such endless apron would cause the fruit to lie upon the dough in strips separated apart, frequently also portion of the fruit would be caused to drop upon other portions and thus make an uneven layer of fruit. By my attachment however it will be seen that by my vibratory or shaker boards the fruit will be deposited perfectly close together so that the biscuits when cut would contain a complete layer of fruit and not leave portion of the biscuit when completed without fruit as is frequently the case where other machines have been employed for the purpose of depositing the fruit upon the dough. Again by providing rollers interposed between the shaker boards, M, and, H, it will be understood that the formation of a perfect biscuit will be insured as there will be no tendency, seeing the fruit is perfectly flat, of portion of such fruit causing unevenness in the surface of the biscuit or forcing itself through the sheet of dough.

Another advantage which I have provided for is the moistening of the fruit after it has been deposited upon the bottom sheet of dough.

I am aware that a machine is not new in in which the fruit is delivered between two layers of dough which is subsequently pressed together and formed into fruit cakes and that in such a machine the fruit is delivered between the two layers by means of an endless belt. In that part of my invention included in the first claim I have combined with the dough carriers the slanting board and means for giving it a lateral tremulous motion with the effect explained of bringing the edge close to the moving dough and by means of the lateral agitation causing the loose fruit to slide evenly from the board onto the dough so as to form an even layer uniformly distributed over the surface, which cannot be done by an endless belt as it drops the loose fruit in windrows arranged laterally across the dough leaving bare spaces.

What I claim as my invention is—

1. The combination with two sets of dough delivery rollers and a traveling apron to receive the sheets of dough from such rollers, of a slanting shaker board suitably supported and having an unbroken plane surface and upturned sides and its forward end supported in close proximity to the sheet of dough and means whereby the board is given a lateral tremulous movement as and for the purpose specified.

2. The combination with two sets of dough delivery rollers and a traveling apron to receive the sheets of dough from such rollers, of a slanting shaker board suitably supported and having an unbroken plane surface and upturned sides and its forward end supported in close proximity to the sheet of dough on the traveling apron, the forward end having attached to it a flexible lip which rests and laterally passes over the sheet of dough as it travels beneath it and means whereby the shaker board is given a lateral tremulous movement as and for the purpose specified.

3. The combination with two sets of dough delivery rollers and a traveling apron to receive the sheets of dough from such rollers, of the upper and lower shaker boards, with means for vibrating them, and the fruit pressing rollers interposed between said boards, the forward end of the lower shaker board extending into proximity with the sheet of dough upon the traveling apron and having a flexible lip attached to it which rests upon the apron as and for the purpose specified.

4. The combination with two sets of dough delivery rollers and a traveling apron to receive the sheets of dough from such rollers, of the upper shaker board and means for giving it a vibratory lateral movement, fruit flattening rollers located beneath the forward end of the upper board, and the lower shaker board having its rear and upper end extending beneath the rollers and its forward end supported slightly above the traveling apron as and for the purpose specified.

5. The combination with two sets of dough delivery rollers and a traveling apron to receive the sheets of dough from such rollers, of the upper and lower shaker boards, the fruit pressing rollers interposed between said boards, the feed hopper supported above the rear end of the upper shaker beard, means for causing a vibratory lateral movement to the shaker boards, a fruit bin having an arcshaped bottom and an endless chain provided with buckets which are constructed and arranged to carry the fruit from the bin to the feed hopper as and for the purpose specified.

6. The combinaton with two sets of dough delivery rollers, traveling apron to receive the sheets of dough from such rollers and a shaker board designed to carry the fruit upon the bottom sheet of dough, of a moisture pipe extending above the traveling apron and having a perforated branch pipe extending from the top of it over the fruit on the sheet of dough as and for the purpose specified.

7. The combination with two sets of dough delivery rollers and a traveling apron to receive the sheets of dough from such rollers, of the shaker board, H, supported and deriving a vibratory movement as specified and the butters, $h''$, extending forwardly from the sides, $h$, of the shaker board, H, as and for the purpose specified.

8. The combination with two sets of dough delivery rollers and a traveling apron to receive the sheets of dough from such rollers, of the shaker board, H, supported and deriving a vibratory movement as specified, and the spring fingers, $h'''$, extending inwardly over the sheet of dough as and for the purpose specified.

9. The combination with two sets of dough delivery rollers and a traveling apron to receive the sheets of dough from such rollers, of a shaker board, H, supported on hangers, N, and the laterally adjustable cross bar, P, rods, $p'$, and, Y, connected to the cross bar, P, and shaker board, H, respectively at one end, and at the other end to the cranks, V and X, the rod W connecting said cranks V and X, the pitman U, and crank wheel T for imparting motion thereto, substantially as described.

10. The combination with two sets of dough delivery rollers and a traveling apron to receive the sheets of dough from such rollers, of a shaker board H, supported on hangers, N, and the laterally adjustable cross bar P, deriving motion as specified and the flattening rollers, I, I', provided with end guiding plates, M', situated at the ends of the space between the rollers as and for the purpose specified.

11. The combination with two sets of dough delivery rollers and a traveling apron to receive the sheets of dough from such rollers, of a shaker board, H, supported on hangers, N, and the laterally adjustable cross bar, P, rods, $p'$, and, Y, connected to the cross bar, P, and shaker board H, respectively at one end and at the other end to the cranks, V and X, the rod W connecting said cranks V and X, the shaker board, M, supported on hangers, Q, and the reach, R, upon the arm, S, the rods, $z^3$, connecting the shaker board, M, to the crank, $z''$, at the upper end of the rod, $z'$, the arm, $z$, secured to the lower end of the rod, $z'$, the crank, V, the rod Z connecting the latter to rod $z'$, which is connected with the pitman, U, and the crank wheel, T, for imparting motion thereto, as and for the purpose specified.

WILLIAM CHRISTIE.

Witnesses:
B. BOYD,
H. L. S. YOUNG.